United States Patent
Hashimoto et al.

(10) Patent No.: US 9,093,915 B2
(45) Date of Patent: Jul. 28, 2015

(54) MOTOR CURRENT DETECTING DEVICE AND AIR CONDITIONING APPARATUS

(75) Inventors: Masafumi Hashimoto, Sakai (JP); Keisuke Shimatani, Sakai (JP); Hirohito Maeda, Kusatsu (JP); Satoshi Yagi, Sakai (JP); Motonobu Ikeda, Sakai (JP)

(73) Assignee: Daikin Industries, Ltd., Osaka (JP)

( * ) Notice: Subject to any disclaimer, the term of this patent is extended or adjusted under 35 U.S.C. 154(b) by 1354 days.

(21) Appl. No.: 12/742,117

(22) PCT Filed: Nov. 13, 2008

(86) PCT No.: PCT/JP2008/070647
§ 371 (c)(1),
(2), (4) Date: May 10, 2010

(87) PCT Pub. No.: WO2009/063927
PCT Pub. Date: May 22, 2009

(65) Prior Publication Data
US 2010/0275627 A1    Nov. 4, 2010

(30) Foreign Application Priority Data
Nov. 16, 2007    (JP) .................... 2007-298474

(51) Int. Cl.
*F25D 17/04*    (2006.01)
*H02M 5/42*    (2006.01)
(Continued)

(52) U.S. Cl.
CPC ............... *H02M 5/42* (2013.01); *F25B 49/022* (2013.01); *F25B 49/025* (2013.01);
(Continued)

(58) Field of Classification Search
CPC ............... F25B 49/022; F25B 49/025; F25B 2600/021; F25B 2700/00; F25B 2700/15; F25B 2700/151; H02M 5/42; H02M 2001/0009
USPC ......... 62/226, 228.4, 230; 340/660, 661, 664; 702/44, 58, 64, 65, 115, 117; 318/139; 388/800, 806, 815, 821, 823
See application file for complete search history.

(56) References Cited

U.S. PATENT DOCUMENTS 5,465,202 A * 11/1995 Ibori et al. ...................... 363/37
5,694,010 A * 12/1997 Oomura et al. .......... 318/400.07
(Continued)

FOREIGN PATENT DOCUMENTS

| JP | 10-290592 A | 10/1998 |
| JP | 2002-95263 A | 3/2002 |

(Continued)

OTHER PUBLICATIONS

International Preliminary Report of corresponding PCT Application No. PCT/JP2008/070647.
(Continued)

*Primary Examiner* — Marc Norman
*Assistant Examiner* — Paolo Gonzalez
(74) *Attorney, Agent, or Firm* — Global IP Counselors

(57) ABSTRACT

A motor current detecting device includes a first wire, an instantaneous current detecting unit, an average electric current detecting unit, and a calculation unit. The first wire is configured and arranged to carry flow of a motor current that has been passed through a motor and a drive current that has been passed through a motor drive unit to drive the motor. The instantaneous current detecting unit is configured and arranged to detect an instantaneous value for a sum of the motor current and the drive current flowing on the first wire. The average electric current detecting unit is configured and arranged to detect an average value of the sum of the motor current and the drive current flowing on the first wire. The calculation unit is configured to calculate the motor current on the basis of the instantaneous value and the average value.

13 Claims, 10 Drawing Sheets

(51) Int. Cl.
*F25B 49/02* (2006.01)
*H02M 1/00* (2007.01)

(52) U.S. Cl.
CPC ...... *F25B 2600/021* (2013.01); *F25B 2700/00* (2013.01); *F25B 2700/15* (2013.01); *F25B 2700/151* (2013.01); *H02M 2001/0009* (2013.01)

(56) References Cited

U.S. PATENT DOCUMENTS

| | | | |
|---|---|---|---|
| 6,040,673 A * | 3/2000 | Isomura et al. | 318/615 |
| 6,153,993 A * | 11/2000 | Oomura et al. | 318/434 |
| 6,931,239 B2 * | 8/2005 | Hongo et al. | 455/103 |
| 7,084,601 B2 * | 8/2006 | Maeda et al. | 318/806 |
| 2005/0068001 A1 * | 3/2005 | Skaug et al. | 318/807 |
| 2007/0024219 A1 * | 2/2007 | Aoyagi et al. | 318/139 |
| 2008/0075439 A1 * | 3/2008 | Huang | 388/811 |
| 2008/0265808 A1 | 10/2008 | Sparey et al. | |

FOREIGN PATENT DOCUMENTS

| | | |
|---|---|---|
| JP | 2005-192358 A | 7/2005 |
| KR | 2007-0067076 A | 6/2007 |

OTHER PUBLICATIONS

Korean Office Action of corresponding Korean Application No. 10-2010-7011496 dated Sep. 1, 2011.

* cited by examiner

MOTOR CURRENT DETECTING DEVICE AND AIR CONDITIONING APPARATUS

CROSS-REFERENCE TO RELATED APPLICATIONS

This U.S. National stage application claims priority under 35 U.S.C. §119(a) to Japanese Patent Application No. 2007-298474, filed in Japan on Nov. 16, 2007, the entire contents of which are hereby incorporated herein by reference.

TECHNICAL FIELD

The present invention relates to a motor current detecting device. The present invention also relates to an air conditioning apparatus comprising the motor current detecting device.

BACKGROUND ART

An air conditioning apparatus comprises a compressor, a fan, and other various devices. A motor is often used as the power source for these devices. The motor is connected to a motor driver unit (called a "driver" below) composed of a plurality of switching elements, and the motor can be rotated by a drive voltage outputted by turning the switching elements in the driver ON and OFF.

Further, sometimes the rotational speed of the motor is controlled to allow the various types of devices such as the compressor and the fan to operate in appropriate state. A motor current that is passed through the motor is often used for such motor rotational speed control. Here, as a method for detecting the motor current, for example, as disclosed in Japanese Laid-open Patent Application No. 2005-192358, there is known a technology where a shunt resistor serving as a current flows and where the motor current is detected on the basis of both end voltages of the shunt resistor.

SUMMARY

Technical Problem

Incidentally, other than when the motor and the driver are separately disposed, sometimes the motor and the driver are built into a motor device. However, in such a motor device, when the technology pertaining to Japanese Laid-open Patent Application No. 2005-192358 is applied to detect the motor current flowing in the motor portion, in terms of the configuration of that motor device, the drive current flowing through the driver ends up flowing in addition to the motor current on the wire where the shunt resistor is connected in series, so obtaining an accurate motor current ends up becoming difficult.

Thus, it is an object of the present invention to provide a motor current detecting device with which an accurate motor current can be obtained and an air conditioning apparatus comprising this motor current detecting device.

Solution to Problem

A motor current detecting device according to a first aspect of the present invention comprises a first wire, an instantaneous current detecting unit, an average current detecting unit, and a calculation unit. On the first wire, a motor current that has been passed through a motor and a drive current that has been passed through a motor drive unit for driving the motor. The instantaneous current detecting unit detects an instantaneous value of the sum of the motor current and the drive current flowing on the first wire. The average current detecting unit detects an average value of the sum of the motor current and the drive current flowing on the first wire. The calculation unit calculates the motor current on the basis of the detection results of the instantaneous current detecting unit and the average current detecting unit.

According to this motor current detecting device, the motor current is calculated using the instantaneous value of the sum of the motor current and the drive current and the average value of the sum of the motor current and the drive current. Therefore, the accurate motor current can be determined.

The motor current detecting device according to a second aspect of the present invention is the motor current detecting device according to the first aspect of the present invention, wherein the calculation unit determines an offset value in the instantaneous value of the sum of the motor current and the drive current as the drive current, and calculates the motor current by subtracting the offset value in the instantaneous value from the average value of the sum of the motor current and the drive current.

The phrase "offset value in the instantaneous value" herein refers to the instantaneous value being substantially near 0 A. According to this motor current detecting device, the motor current is determined by subtracting the offset value from the average value of the sum of the motor current and the drive current. Thus, the motor current detecting device is capable of determining the motor current through a simple calculation.

The motor current detecting device according to a third aspect of the present invention is the motor current detecting device according to the first or second aspect, further comprising a second wire and a third wire. The second wire is a wire for transferring to the calculation unit the instantaneous value of the sum of the motor current and the drive current detected by the instantaneous current detecting unit. The third wire is a wire for transferring to the calculation unit the average value of the sum of the motor current and the drive current detected by the average current detecting unit. The calculation unit has a first input unit and a second input unit. The first input unit is connected to the second wire, whereby the instantaneous value of the sum of the motor current and the drive current is inputted. The second input unit is connected to the third wire, whereby the average value of the sum of the motor current and the drive current is inputted.

According to this motor current detecting device, the calculation unit can acquire the average value of the sum of the motor current and the drive current and the instantaneous value of the sum of the motor current and the drive current via the first input unit and the second input unit.

The motor current detecting device according to a fourth aspect of the present invention is the motor current detecting device according to the third aspect, further comprising a current detecting unit. The current detecting unit detects the sum of the motor current and the drive current flowing on the first wire. The instantaneous current detecting unit has first resistors and a first capacitor. The first resistors are connected in series between the current detecting unit and the second wire. The first capacitor is connected in parallel to the first resistors. The average current detecting unit has second resistors and second capacitors. The second resistors are connected in series between the current detecting unit and the third wire. The second capacitors are connected in parallel to the second resistors. A first time constant of the first resistors and the first capacitor is less than a second time constant of the second resistors and the second capacitors.

According to this motor current detecting device, the instantaneous current detecting unit and the average current detecting unit are configured from so-called filter circuits composed of resistors and capacitors, and the time constants of the filter circuits are determined so that the instantaneous value of the sum of the motor current and the drive current or the average value of the sum of the motor current and the drive current can be detected. Thus, the instantaneous value of the sum of the motor current and the drive current and the average value of the sum of the motor current and the drive current can be detected by an instantaneous current detecting unit and an average current detecting unit which are physical means and which have simple configurations.

The motor current detecting device according to a fifth aspect of the present invention is the motor current detecting device according to any of the first through fourth aspects, wherein the motor and the motor drive unit are included in a motor device.

When the motor and the motor drive unit are built into the motor device, in terms of the configuration thereof, it is difficult to separately dispose the wire on which the motor current that has been passed through the motor flows and the wire on which the drive current that has been passed through the motor drive unit flows. However, when the motor current detecting device according to the present invention is applied in such a case, the motor current detecting device can calculate the motor current with precision because the motor current is determined using the instantaneous value of the sum of the motor current and the drive current and the average value of the sum of the motor current and the drive current.

The motor current detecting device according to a sixth aspect of the present invention is the motor current detecting device according to any of the first through fifth aspects, further comprising a current leveling unit. The current leveling unit levels the drive current before the drive current flows on the first wire.

According to this motor current detecting device, on the first wire, the motor current and leveled drive current flow. Consequently, the instantaneous current detecting unit and the average current detecting unit respectively detect the instantaneous value of the sum of the motor current and the leveled drive current and the average value of the sum of the motor current and the leveled drive current, and the calculation unit can therefore calculate an even more precise motor current.

The motor current detecting device according to a seventh aspect of the present invention is the motor current detecting device according to the sixth aspect, further comprising a fourth wire. On the fourth wire, the drive current flows. The current leveling unit has a third resistor and a third capacitor. The third resistor is connected in series on the fourth wire. The third capacitor is connected to the fourth wire in parallel to the third resistor.

The current leveling unit in this motor current detecting device is configured from a so-called filter circuit composed of resistor and capacitor. Thus, the motor current detecting device is capable of leveling the drive current by the current leveling unit having a simple configuration.

An air conditioning apparatus according to an eighth aspect of the present invention comprises a motor current detecting device, a fan motor, a fan, and a control unit. The motor current detecting device is the motor current detecting device according to any of the first through seventh aspects. The fan motor is included in the motor drive unit together with the motor device, and the motor current is passed through the fan motor. The fan is driven to rotate by the fan motor. The control unit performs control the volume of air sent into a room from the fan on the basis of the motor current calculated by the calculation unit of the motor current detecting device.

According to this air conditioning apparatus, it is possible to perform control such that the volume of air sent into a room is constant, for example, on the basis of an accurate motor current calculated by the motor current detecting device.

Advantageous Effects of Invention

With the motor current detecting device according to the first aspect, the motor current is calculated using the instantaneous value of the sum of the motor current and the drive current and the average value of the sum of the motor current and the drive current. Consequently, the accurate motor current can be determined.

With the motor current detecting device according to the second aspect, the motor current is determined by subtracting the offset value from the average value of the sum of the motor current and the drive current. Thus, the motor current detecting device can determine the motor current by a simple calculation.

With the motor current detecting device according to the third aspect, the calculation unit can acquire the average value of the sum of the motor current and the drive current and the instantaneous value of the sum of the motor current and the drive current via the first input unit and the second input unit.

With the motor current detecting device according to the fourth aspect, the instantaneous value of the sum of the motor current and the drive current and the average value of the sum of the motor current and the drive current are detected by the instantaneous current detecting unit and the average current detecting unit, which are physical means and which have simple configurations.

With the motor current detecting device according to the fifth aspect, a precise motor current is obtained even in cases in which the motor and the motor drive unit are built into the motor device, because the motor current is determined using the instantaneous value of the sum of the motor current and the drive current and the average value of the sum of the motor current and the drive current.

With the motor current detecting device according to the sixth aspect, the instantaneous current detecting unit and the average current detecting unit respectively detect the instantaneous value of the sum of the motor current and the leveled drive current and the average value of the sum of the motor current and the leveled drive current, and the calculation unit is therefore capable of calculating an even more precise motor current.

With the motor current detecting device according to the seventh aspect, the drive current is leveled by the current leveling unit having a simple configuration.

With the air conditioning apparatus according to the eighth aspect, it is possible to perform control such that the volume of air sent into a room is constant, for example, on the basis of an accurate motor current calculated by the motor current detecting device.

DETAILED DESCRIPTION OF EMBODIMENT(S)

The following is a description, made with reference to the drawings, of a motor current detecting device according to the present invention and an air conditioning apparatus comprising this motor current detecting device.

(1) Configuration

Figure 1:
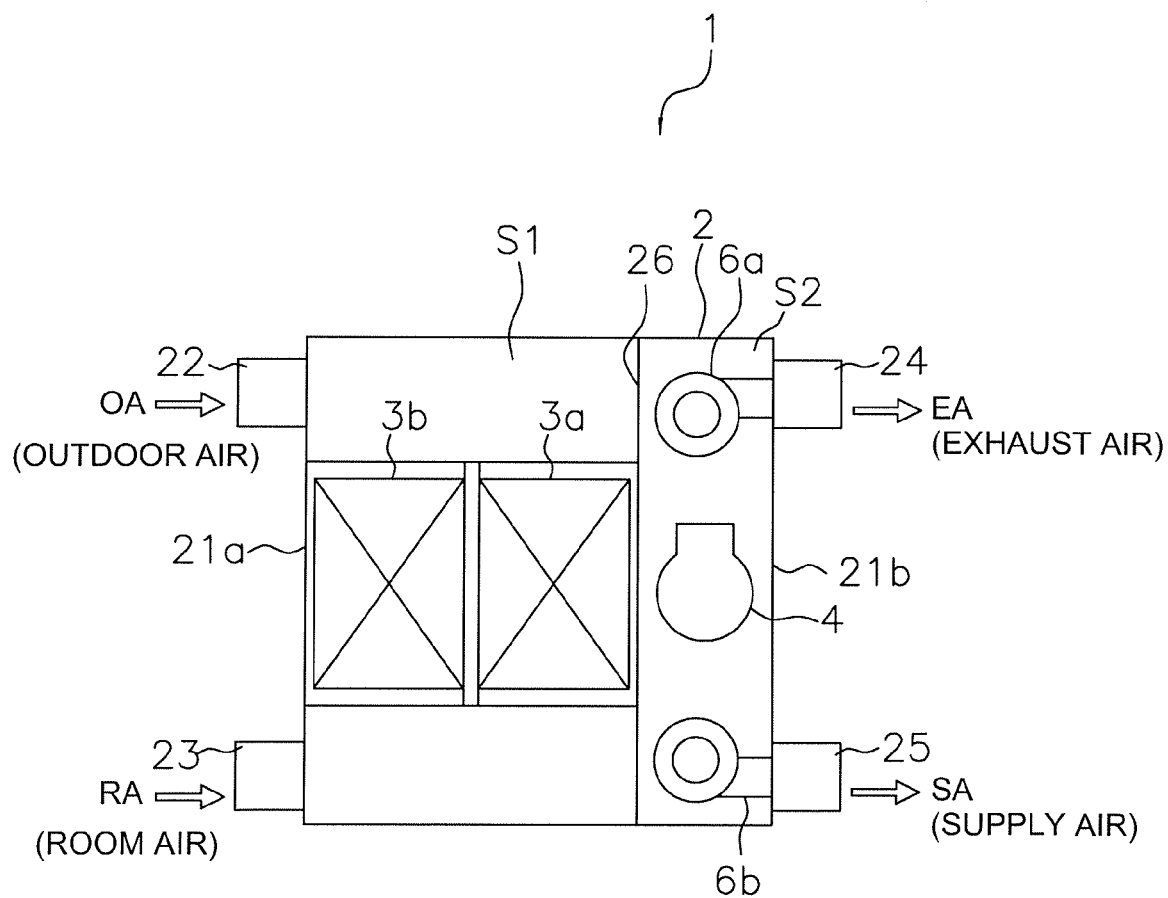
FIG. 1 is a schematic plan view showing the configuration of an air conditioning apparatus according to the present embodiment.

FIG. 1 is a schematic plan view showing the configuration of an air conditioning apparatus 1 according to an embodiment of the present invention. The air conditioning apparatus 1 of FIG. 1 is a desiccant-type outdoor air conditioner wherein silica gel or another adsorptive agent is maintained on the surfaces of heat exchangers, and the air supplied to indoor space is subjected to a cooling and dehumidifying operation or a heating and humidifying operation.

This type of air-conditioning apparatus 1 comprises mainly a casing 2, first and second heat exchangers 3a, 3b, a compressor 4, a compressor motor 5, first and second fans 6a, 6b, a first fan motor 7, a second fan motor device 8, a motor current detecting device 9, and a control unit 11, as shown in FIGS. 1 through 4 and FIG. 8. The first heat exchanger 3a, the second heat exchanger 3b, and the compressor 4 constitute a refrigerant circuit such as the one shown in FIG. 2.

(1-1) Casing

The casing 2 has a substantially rectangular parallelepiped shape, inside which are housed the first and second heat exchangers 3a, 3b, the compressor 4, the first and second fans 6a, 6b, and other components. In FIG. 1, in a left side surface plate 21a of the casing 2 are formed a first suction opening 22 for sucking outdoor air OA into the interior of the casing 2 and a second suction opening 23 for sucking room air RA into the interior of the casing 2. In a right side surface plate 21b of the casing 2 are formed a first blowout opening 24 for blowing out exhaust air EA to the outdoor and a second blowout opening 25 for supplying air SA after humidity conditioning to the room. A duct that extends into the room is connected to the second blowout opening 25, and the supplying air SA after being humidity-conditioned to the room through this duct.

A partitioning plate 26 for partitioning the interior of the casing 2 is provided inside the casing 2. The interior of the casing 2 is divided by this partitioning plate 26 into an air chamber S1 and a machine chamber S2. The first and second heat exchangers 3a, 3b and the partitioning member between the heat exchangers 3a, 3b are disposed in the air chamber S1, and the other devices excluding the first and second heat exchangers 3a, 3b (i.e., the compressor 4, the first and second fans 6a, 6b, etc.) are disposed in the machine chamber S2.

(1-2) Heat Exchangers

Figure 3:
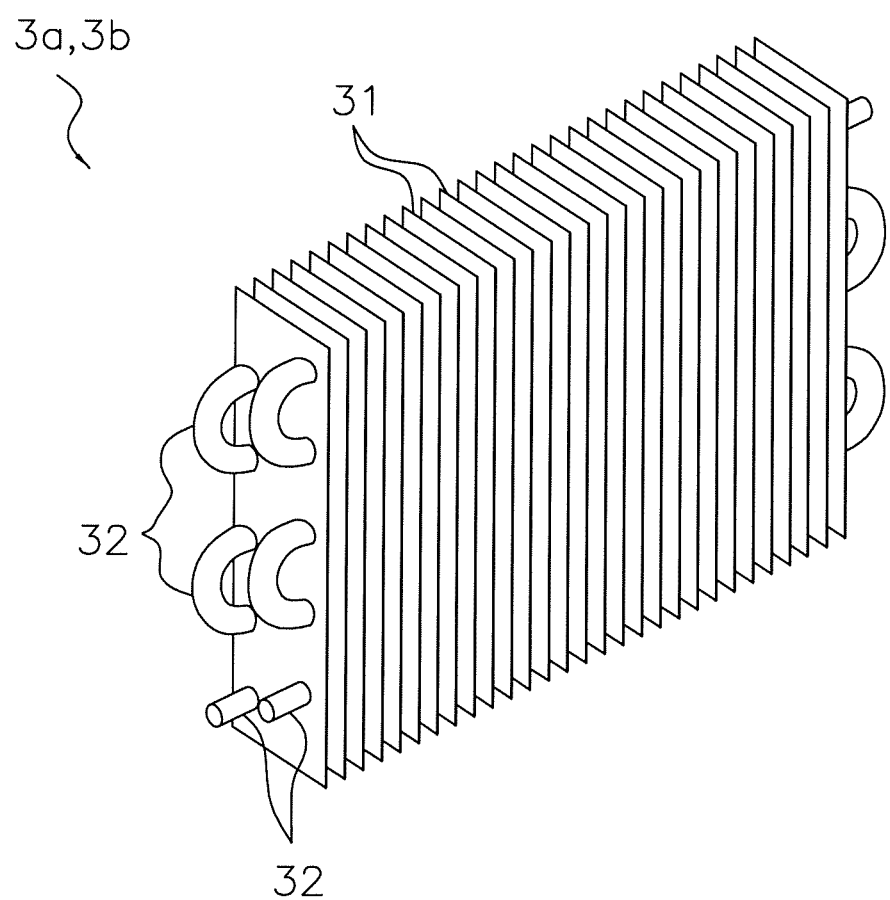
FIG. 3 is a perspective view of the first and second heat exchangers provided to the air conditioning apparatus.

The first heat exchanger 3a and the second heat exchanger 3b are cross-fin type fin-and-tube heat exchangers, comprising numerous aluminum fins 31 formed into substantially rectangular plate shapes, and copper heat transfer tubes 32 passing through the fins 31 as shown in FIG. 3. An absorptive agent which adsorbs the moisture contained in the air passing through the heat exchangers 3a, 3b is applied by dip molding (dip forming) or the like over the outside surfaces of the fins 31 and the heat transfer tubes 32. The adsorptive agent herein can be zeolite, silica gel, active carbon, a hydrophilic or water-absorbing organic macromolecular polymer-based material, an ion-exchange resin-based material having a carboxylic group or sulfonic group, a temperature-sensitive polymer or another functional polymer material, or the like.

Figure 2:
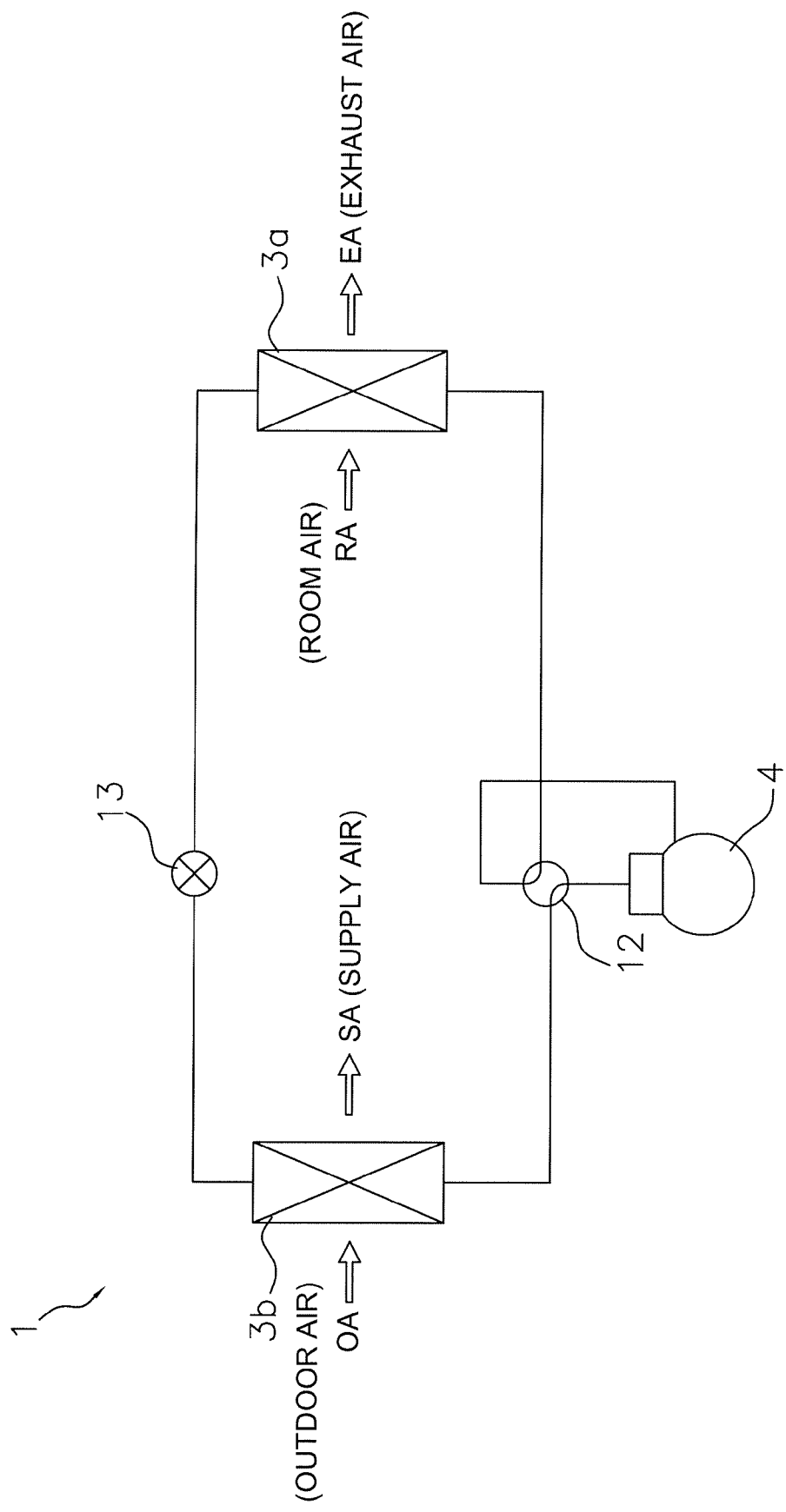
FIG. 2 is a refrigerant circuit diagram of the air conditioning apparatus according to the present embodiment.

These first and second heat exchangers 3a, 3b are connected to each other via an expansion valve 13 as shown in FIG. 2. For example, the first heat exchanger 3a conducts heat exchange with the room air RA taken in through the second suction opening 23, and the second heat exchanger 3b conducts heat exchange with the outdoor air OA taken in through the first suction opening 22. The room air RA after heat exchange is exhausted to the outdoors as exhaust air EA, and the outdoor air OA after heat exchange is supplied into the room as supplying air SA.

The first and second heat exchangers 3a, 3b are controlled by the control unit 11 so as to enable a first state in which the first heat exchanger 3a functions as a condenser and the second heat exchanger 3b functions as an evaporator, or a second state in which the first heat exchanger 3a functions as an evaporator and the second heat exchanger 3b functions as a condenser. In the first state, an adsorptive agent reproducing action is performed for removing moisture from the adsorptive agent when the first heat exchanger 3a functions as a condenser, and an adsorption action is performed for causing moisture to adsorb to the adsorptive agent when the second heat exchanger 3b functions as an evaporator. In the second state, an adsorption action is performed for causing moisture to adsorb to the adsorptive agent when the first heat exchanger 3a functions as an evaporator, and an adsorptive agent reproducing action is performed for removing moisture from the adsorptive agent when the second heat exchanger 3b functions as a condenser. By alternatively performing the adsorption action and the reproducing action in this manner and switching the flow channels of the air EA, SA supplied in and out of the room through the heat exchangers 3a, 3b, the moisture in the adsorptive agent can be continually adsorbed and emitted (i.e., removed). Consequently, the air conditioning apparatus 1 can perform various operations while maintaining dehumidification performance or humidification performance.

The flow channels of the air EA, SA supplied in and out of the room through the heat exchangers 3a, 3b are switched by a switching damper (not shown). The switching damper switches the flow channels of the air so that the outdoor air OA or room air RA aore blown out from the first blowout opening port 24 or the second blowout opening port 25 after passing through either the first heat exchanger 3a or the second heat exchanger 3b.

(1-3) Compressor and Compressor-Use Motor

The compressor 4 is connected to the first heat exchanger 3a and the second heat exchanger 3b via a four-way switching valve 12 as shown in FIG. 2. The compressor 4 compresses refrigerant from the first heat exchanger 3a or second heat exchanger 3b functioning as an evaporator. The compressor 4 performing a compressing action is driven by the compressor-use motor 5.

The compressor-use motor 5 is connected to the compressor 4. The compressor-use motor 5 is a brushless DC motor, for example, and is driven to rotate by a driver 51 (FIG. 8) for the compressor-use motor 5.

(1-4) Fan and Fan Motor

The first fan 6a is disposed in a position corresponding to the first blowout opening 24, and the exhaust air EA is blown outside of the casing 2 (specifically, the outdoors) via the first blowout opening 24 as shown in FIG. 1. The second fan 6b is disposed in a position corresponding to the second blowout opening 25, and the supplying air SA is blown outside of the casing 2 (specifically, into the room) via the second blowout opening 25. The first fan 6a is driven to rotate by the first fan motor 7 (FIG. 8), and the second fan 6b is driven to rotate by the second fan motor device 8.

Figure 4:
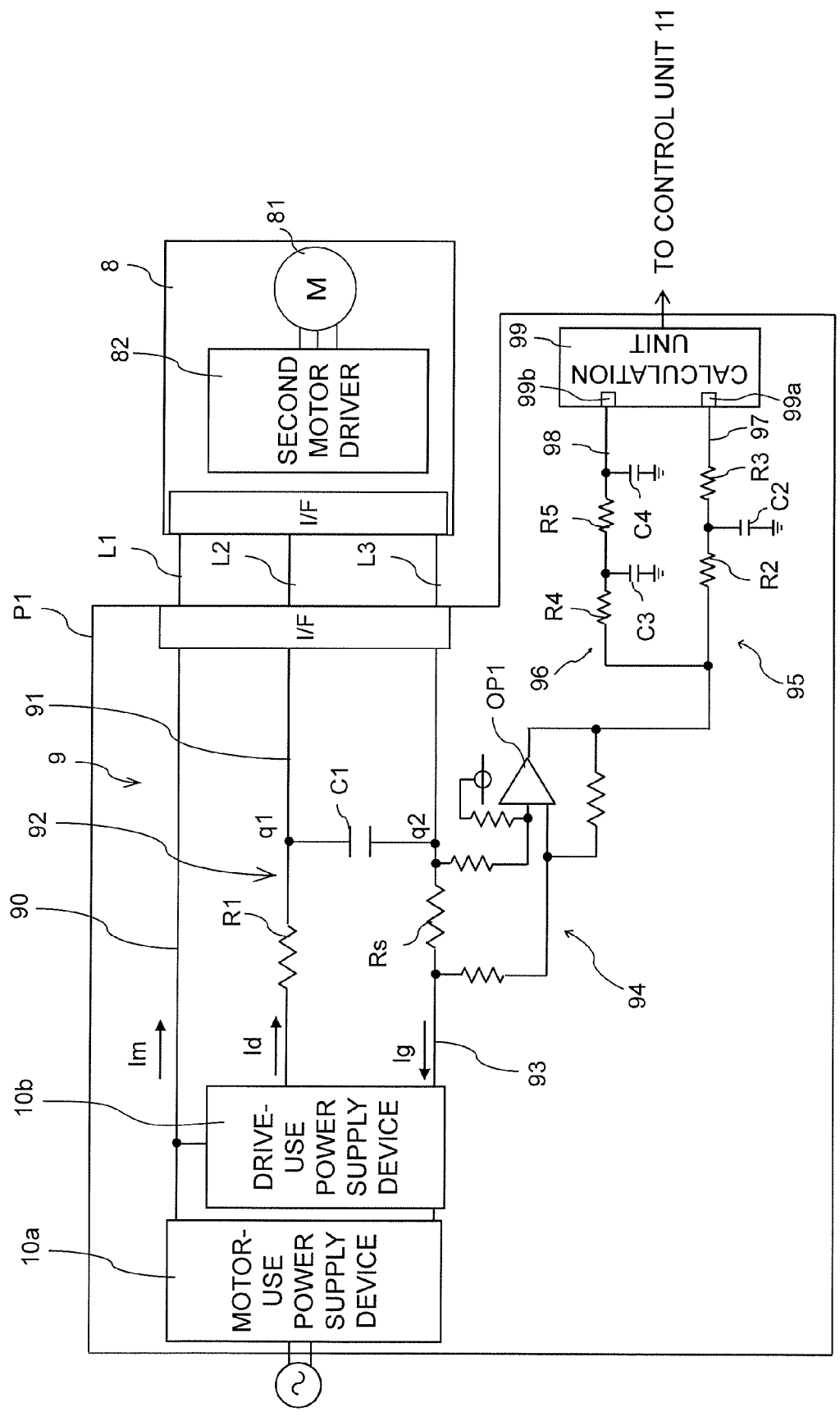
FIG. 4 is a diagram showing the circuit configuration in a printed board equipped with the motor current detecting device according to the present embodiment, and the schematic configuration of a second fan motor device connected to the printed board.
Figure 8:
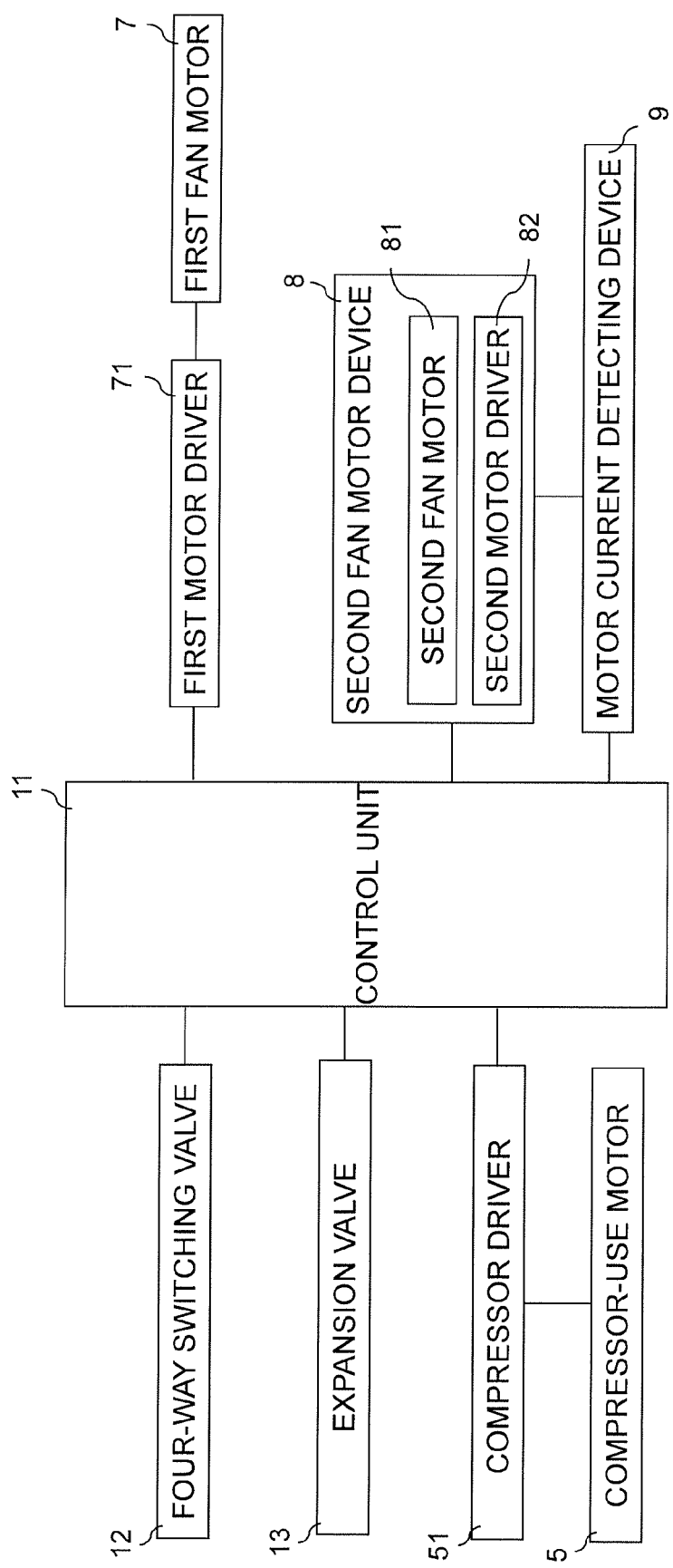
FIG. 8 is a block diagram schematically depicting the configuration of the air conditioning apparatus according to the present embodiment.

The first fan motor 7 is connected to the first fan 6a. Like the compressor motor 5, the first fan motor 7 is a brushless DC motor for example, and is controlled to rotate by a first motor driver 71 for the first fan motor 7. The second fan motor device 8 is connected to the second fan 6b, and is a device including a second fan motor 81 and a second motor driver 82 (equivalent to a motor drive unit) as shown in FIGS. 4 and 8. The second fan motor 81 is a brushless DC motor for example, specifically having a rotor composed of a permanent magnet having a plurality of magnetic poles, and a stator having a drive coil. The second motor driver 82 is for driving the second fan motor 81 to rotate and includes a switching element for passing a current through the drive coil of the second fan motor 81. The second motor driver 82 configured in this manner outputs to the second fan motor 81 a drive voltage corresponding to the position of the rotor relative to the stator.

(1-5) Motor Current Detecting Device

The motor current detecting device 9 is for detecting a motor current Im passed through the second fan motor 81, and the motor current detecting device 9 is mounted on a printed board P1 together with a motor-use power supply device 10a that generates power for supply to the second fan motor 81 (hereinafter called "motor-use power") and a drive power supply device 10b that generates power for supply to the second motor driver 82 (hereinafter called "drive-use power"). Here, examples of type of the motor-use power supply device 10a and the drive-use power supply device 10b include a dropper power supply and a switching power supply. The printed board P1 and the second fan motor device 8 are connected by three harnesses L1, L2, L3 between the interface of the printed board P1 and the interface of the second fan motor device 8. Two harnesses L1, L2 of these three harnesses L1 to L3 are harnesses for the power outputted from each of the power supply devices 10a, 10b, and the remaining one harness L3 is a harness for a GND of the second fan motor device 8.

The configuration of the motor current detecting device 9 according to the present embodiment is described below mainly using FIG. 4. The motor current detecting device 9 comprises a motor-use power supply wire 90, a drive-use power supply wire 91 (equivalent to a fourth wire), a current leveling unit 92, a GND wire 93 (equivalent to a first wire), a current detecting unit(detector) 94, an instantaneous current detecting unit(detector) 95, an average current detecting unit (detector) 96, an instantaneous current transmission line 97 (equivalent to a second wire), an average current transmission line 98 (equivalent to a third wire), and a calculation unit 99.

<Motor-Use Power Supply Wire>

The motor-use power supply wire 90 is a wire joining the output of the motor-use power supply device 10a and the interface of the printed board P1, and a motor-use power supply outputted from the motor-use power supply device 10a is applied thereto. The motor power supply is applied to the second fan motor 81 of the second fan motor device 8 via the harness L1. Therefore, the motor current Im passed through the second fan motor 81 flows on the motor-use power supply wire 90.

<Drive-Use Power Supply Wire>

The drive-use power supply wire 91 is a wire joining the output of the drive-use power supply device 10b and the interface of the printed board P1, and a drive-use power supply outputted from the drive-use power supply device 10b is applied thereto. This drive power supply is applied to the second motor driver 82 of the second fan motor device 8 via the harness L2. Therefore, a drive current Id passed through the second motor driver 82 flows on the drive-use power supply wire 91.

<Current Leveling Unit>

The current leveling unit 92 levels the drive current Id before it flows on the GND wire 93, i.e., the drive current Id flowing on the drive-use power supply wire 91. The current leveling unit 92 is configured from a filter circuit composed of a resistor R1 (equivalent to a third resistor) and a capacitor C1 (equivalent to a third capacitor). The resistor R1 is connected in series on the drive-use power supply wire 91, and the capacitor C1 is connected to the drive-use power supply wire 91 in parallel to the resistor R1. More specifically, one end q1 of the capacitor C1 is connected to the drive-use power supply wire 91 on the drive current Id downstream side of the resistor R1, and another end q2 is connected to the GND wire 93.

Figure 5:
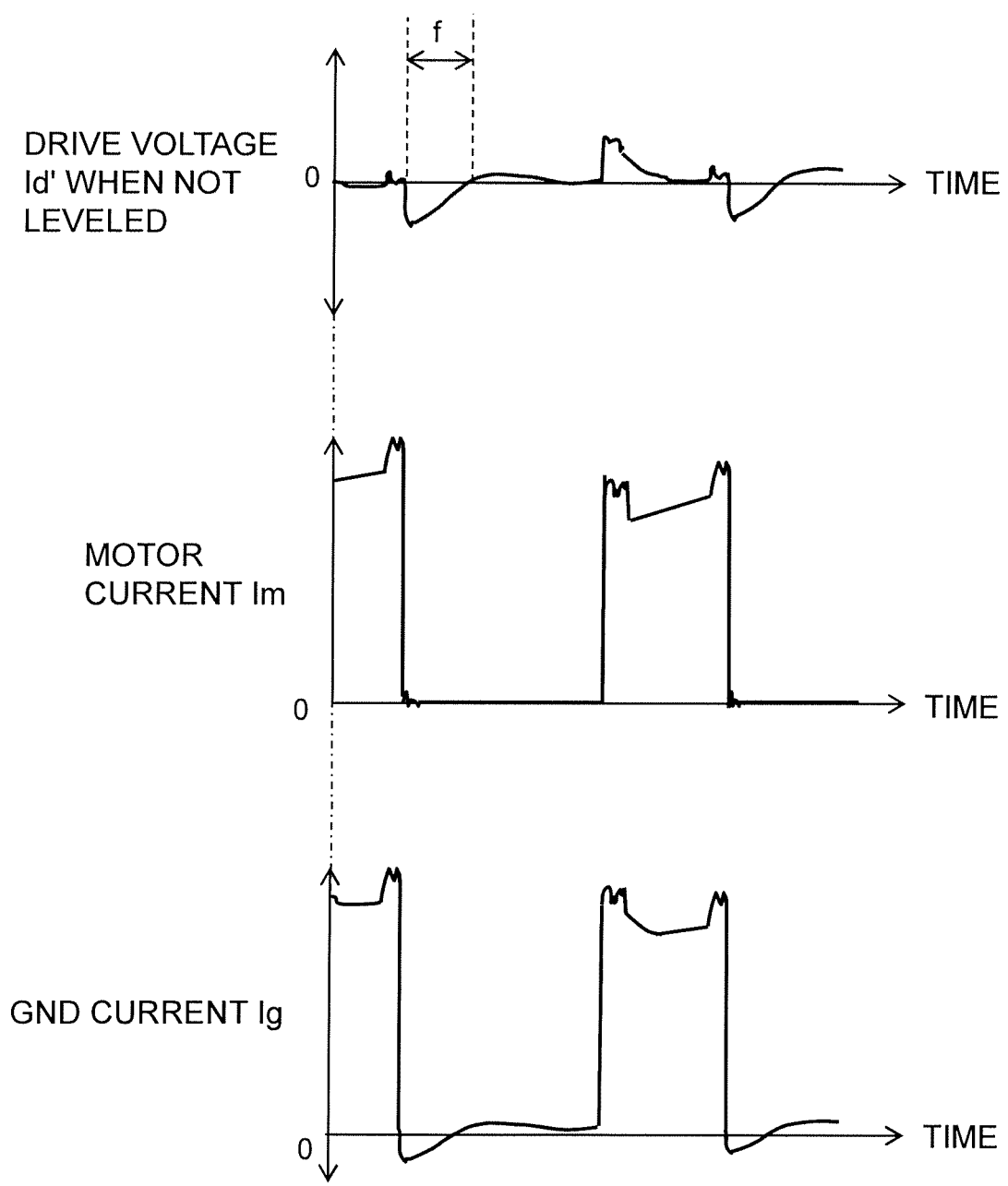
FIG. 5 is a graph showing temporal changes in the drive current Id', a motor current Im and a GND current Ig when a current leveling component is not disposed.

The resistance value of the resistor R1 and the capacitance value of the capacitor C1 are herein determined as follows, for example. First, in a drive current Id' when the current leveling unit 92 is not disposed, the drive current Id' particularly changes, so a frequency f of the portion that should be leveled is measured (FIG. 5). Then, the resistance value of the resistor R1 and the capacitance value of the capacitor C1 are determined such that this frequency f becomes substantially equal to a time constant of the resistor R1 and the capacitor C1. The drive current Id' is leveled in this manner shown in FIG. 6 by a filter circuit configured from the resistor R1 and capacitor C1 thus determined.

<GND Wire>

The GND wire 93 is a wire joining the GND of the power supply devices 10a, 10b and the interface of the printed board P1, and is connected to the GND of the second fan motor device 8 via the harness L3. Therefore, the motor current Im passed through the second fan motor 81 and the drive current Id leveled by the current leveling unit 92 and passed through the second motor driver 82 both flow through the GND wire 93. For the sake of convenience in the description, the current flowing the GND wire 93 (i.e., the motor current Im and the leveled drive current Id) will be called a GND current Ig below.

<Current Detecting Unit>

The current detecting unit 94 detects the GND current Ig flowing on the GND wire 93, i.e., the sum of the motor current Im and the leveled drive current Id. The current detecting unit 94 is mainly configured by a shunt resistor Rs, an op-amp OP1, and other units. The shunt resistor Rs is connected in series to the GND wire 93. More specifically, the shunt resistor Rs is connected to the GND wire 93 on the GND current Ig downstream side of the other end q2 of the capacitor C1 in the current leveling unit 92. Two input terminals of the op-amp OP1 are connected to both end portions of the shunt resistor Rs, and the output terminal is connected to the instantaneous current detecting unit 95 and the average current detecting unit 96. In this op-amp OP1, when the voltage inputted via the input terminals is amplified by a predetermined gain, the resulting voltage is outputted to the instantaneous current detecting unit 95 and the average current detecting unit 96.

<Instantaneous Current Detecting Unit and Average Current Detecting Unit>

The instantaneous current detecting unit 95 detects an instantaneous value of the GND current Ig on the GND wire 93 as detected by the current detecting unit 94, i.e., an instantaneous value of the sum of the motor current Im and the leveled drive current Id. The instantaneous current detecting unit 95 is configured from two resistors R2, R3 (equivalent to a first resistor) and one capacitor C2 (equivalent to a first capacitor). The two resistors R2, R3 are connected in series between the current detecting unit 94 and the instantaneous current transmission line 97. The capacitor C2 is connected in parallel to the resistors R2, R3. More specifically, one end of the capacitor C2 is connected between the two resistors R2, R3, and the other end is connected to GND.

The average current detecting unit 96 detects the average value of the GND current Ig on the GND wire 93 as detected by the current detecting unit 94, i.e., the average value of the sum of the motor current Im and the leveled drive current Id. The average current detecting unit 96 is configured from two resistors R4, R5 (equivalent to a second resistor) and two capacitors C3, C4 (equivalent to a second capacitor). The two resistors R4, R5 are connected in series between the current detecting unit 94 and the average current transmission line 98. The two capacitors C3, C4 are connected in parallel to the resistors R4, R5, respectively. More specifically, one end of the capacitor C3 is connected between the two resistors R4, R5, and the other end is connected to GND. One end of the capacitor C4 is connected between the resistor R5 and the average current transmission line 98, and the other end is connected to GND.

The resistance values of the resistors R2, R3 and the capacitance value of the capacitor C2 of the instantaneous current detecting unit 95 described above are determined to be values whereby the instantaneous value of the GND current Ig can be detected, and the resistance values of the resistors R4, R5 and the capacitance values of the capacitors C3, C4 of the average current detecting unit 96 are determined to be values whereby the average value of the GND current Ig can be detected. More specifically, the values of the resistors R2 to R5 and of the capacitors C2 to C4 are determined so that the first time constant of the resistors R2, R3 and the capacitor C2 in the instantaneous current detecting component 95 is less than the second time constant of the resistors R4, R5 and the capacitors C3, C4 in the average current detecting unit 96.

<Instantaneous Current Transmission Line and Average Current Transmission Line>

The instantaneous current transmission line 97 is a line for transferring the instantaneous value of the GND current Ig detected by the instantaneous current detecting unit 95 to the calculation unit 99, and for connecting the output of the instantaneous current detecting unit 95 with an input port 99a (equivalent to a first input unit) of the calculation unit 99.

The average current transmission line 98 is a line for transferring the average value of the GND current Ig detected by the average current detecting unit 96 to the calculation unit 99, and for connecting the output of the average current detecting unit 96 with an input port 99b (equivalent to a second input unit) of the calculation unit 99.

<Calculation Unit>

The calculation unit 99 is a microcomputer configured from RAM, ROM, or another type of memory, and a CPU. The calculation unit 99 calculates the motor current Im on the basis of the detection results of the instantaneous current detecting unit 95 and the average current detecting unit 96. The calculation unit 99 has two input ports 99a, 99b. One input port 99a of the two input ports 99a, 99b is connected to the instantaneous current transmission line 97, and the instantaneous value of the GND current Ig is inputted. The other input port 99b is connected to the average current transmission line 98, and the average value of the GND current Ig is inputted. In this calculation unit 99, when the instantaneous value and average value of the GND current Ig are acquired via the input ports 99a, 99b, the values are sampled at predetermined time intervals and subjected to A/D conversion, and the motor current Im is calculated using the A/D converted instantaneous value and average value of the GND current Ig.

Figure 6:
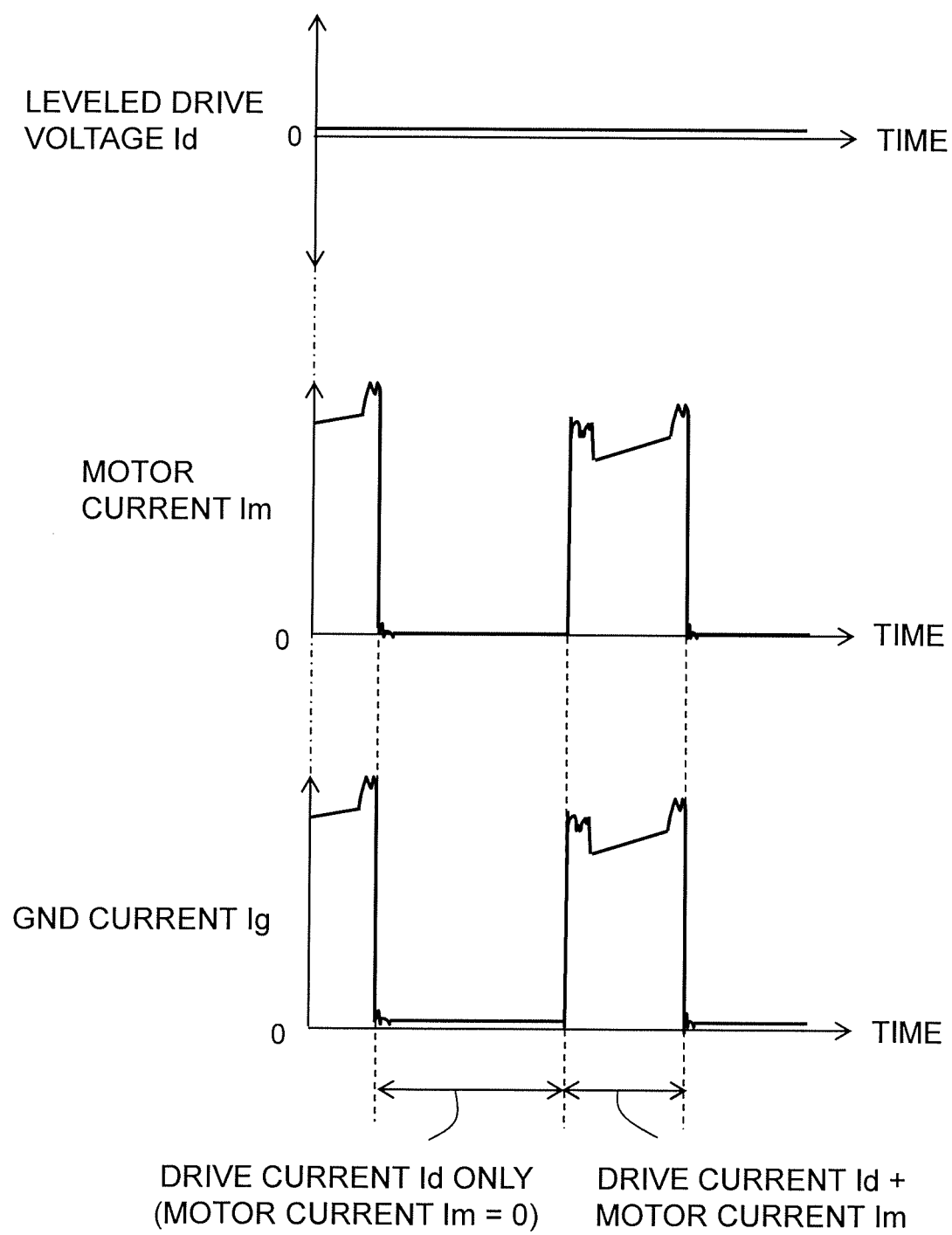
FIG. 6 is a graph showing temporal changes in the drive current Id, the motor current Im and the GND current Ig when the drive current has been leveled using a current leveling unit.
Figure 7:
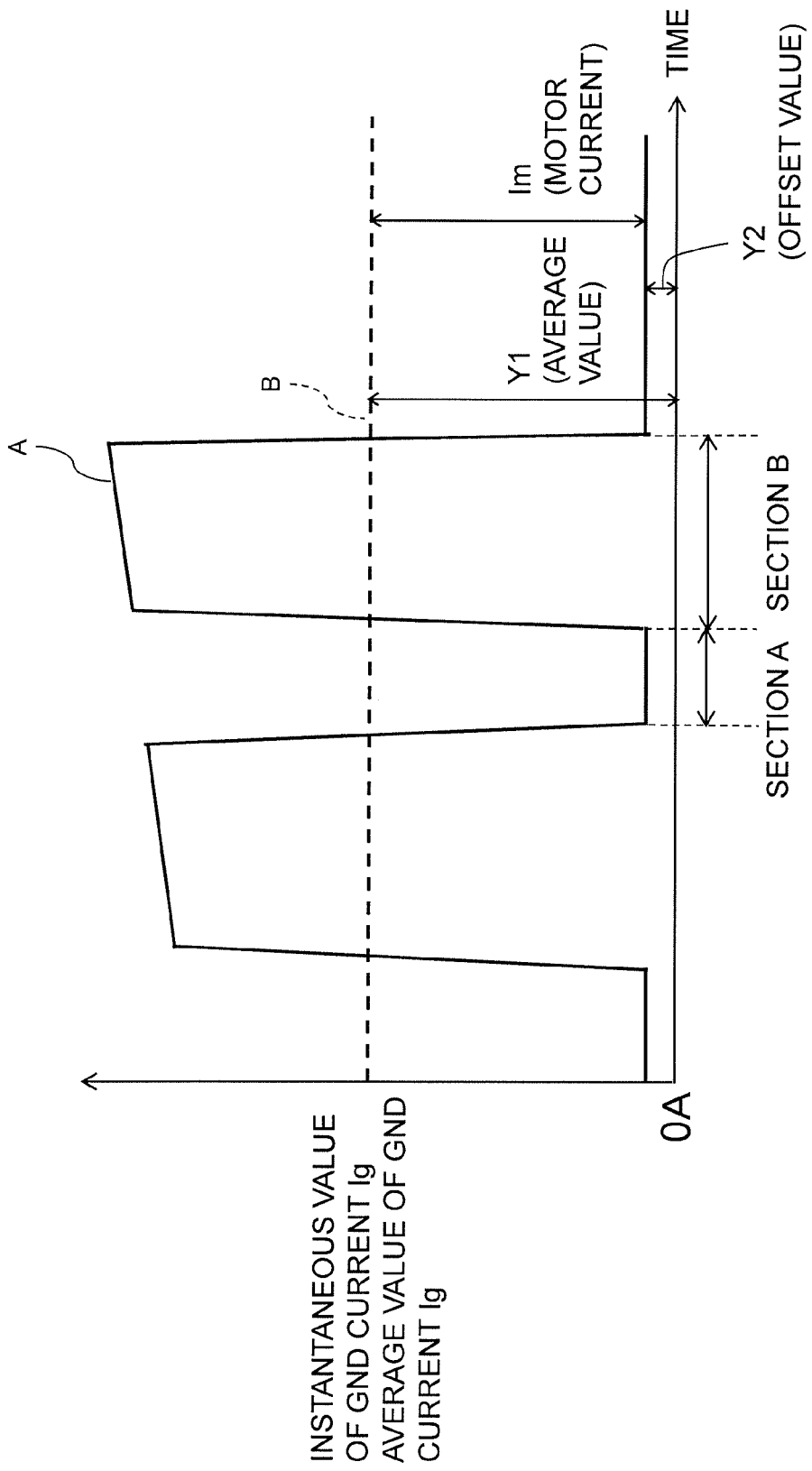
FIG. 7 is a graph showing temporal changes in the instantaneous value and the average value of the GND current Ig.

FIG. 7 is used herein to describe the manner in which the calculation unit 99 calculates the motor current Im. FIG. 7 is a graph showing temporal changes in the instantaneous value and the average value of the GND current Ig inputted to the input ports 99a, 99b. In FIG. 7, the solid line graph A represents the instantaneous value of the GND current Ig inputted to the input port 99a, and the dashed line graph B represents the average value of the GND current Ig inputted to the input port 99b. The average value of the GND current Ig inputted to the input port 99b is substantially constant as shown in FIG. 7, while the instantaneous value of the GND current Ig inputted to the input port 99a has both sections where the instantaneous value is less than the average value of the GND current Ig and near 0 A (section A in FIG. 7), and sections where the instantaneous value is greater than the average value of the GND current Ig (section B in FIG. 7). The reason for this is because the motor current Im is passed through the second fan motor 81 cyclically, whereas the drive current Id stays substantially constant (i.e., in a state near 0 A), having been leveled by the current leveling unit 92 (FIG. 6). Therefore, the instantaneous value of the GND current Ig has a section containing only the drive current Id, wherein the motor current Im is not passed through the second fan motor 81, such as in section A. The calculation unit 99 then determines the instantaneous value of the GND current Ig in a section where the value stays near 0 A as in section A, i.e., an offset value Y2 in the instantaneous value of the GND current Ig as the drive current Id. The calculation unit 99 calculates the motor current Im by subtracting the drive current Id, i.e. the offset value Y2 in the instantaneous value from the average value Y1 of the GND current Ig (Im=Y1−Y2).

(1-6) Control Unit

The control unit 11 is a microcomputer configured from RAM, ROM, or another type of memory, and a CPU, and is disposed separately from the calculation unit 99 of the motor current detecting device 9 in the present embodiment. The control unit 11 is connected to the four-way switching valve 12, the expansion valve 13, the compressor driver 51, and the first motor driver 71 as shown in FIG. 8, and the control unit 11 performs control for the devices to which it is connected. For example, the control unit 11 performs pathway switching control for the four-way switching valve 12, drive control for the compressor driver 51 and the first motor driver 71, and other types of control.

Particularly, the control unit 11 according to the present embodiment is also connected to the second fan motor device 8 and the motor current detecting device 9, and the control unit 11 performs a control for these devices. Specifically, the control unit 11 performs control of the volume of air sent into the room from the second fan 6b by performing rotational speed control of the second fan motor 81 on the basis of the motor current Im calculated by the calculation unit 99 of the motor current detecting device 9. For example, the control unit 11 generates a control signal for turning the switching elements in the second motor driver 82 on and off on the basis of the motor current Im so that the air volume into the room is substantially constant, and the control unit 11 outputs the generated control signal to the second fan motor device 8. A drive voltage based on the control signal from the control unit 11 is thereby outputted to the second fan motor 81 from the second motor driver 82 of the second fan motor device 8, and the second fan motor 81 rotates.

As described above, the control unit 11 controls the rotational speed of the second fan motor 81 and controls the air volume into the room by using the motor current Im, whereby it is possible to maintain substantial consistency in the air volume which is normally susceptible to the effects of factors such as the length of wire extending into the room from the second blowout opening 25 and the air pressure which varied depending on the width of the room interior.

(2) Effects (A)

With the motor current detecting device 9 according to the present embodiment, the motor current Im is calculated by the calculation unit 99 using the instantaneous value of the sum of the motor current Im and the drive current Id and the average value of the sum of the motor current Im and the drive current Id. Consequently, the accurate motor current Im can be determined.

(B)

With the motor current detecting device 9 according to the present embodiment, the calculation unit 99 determines the offset value Y2 in the instantaneous value of the sum of the motor current Im and the drive current Id (specifically, the instantaneous value where it is substantially near 0 A) as the drive current Id, and calculates the motor current Im by subtracting the offset value Y2 of the instantaneous value from the average value Y1 of the sum of the motor current Im and the drive current Id. Thus, the motor current detecting device 9 can determine the motor current Im by a simple calculation.

(C)

The calculation unit 99 in the motor current detecting device 9 has two input units 99a, 99b. The calculation unit 99 can thereby acquire the average value of the sum of the motor current Im and the drive current Id and the instantaneous value of the sum of the motor current Im and the drive current Id via the first input unit 99a and the second input unit 99b.

(D)

The instantaneous current detecting unit 95 and the average current detecting unit 96 in the motor current detecting device 9 are configured from so-called filter circuits composed of resistors R2 to R5 and capacitors C2 to C4. The values of the resistors R2 to R5 and the capacitors C2 to C4 are determined so as to fulfill the condition that the first time constant of the instantaneous current detecting unit 95 be less than the second time constant of the average current detecting unit 96. In other words, the time constants are determined so as to enable detection of the instantaneous value of the sum of the motor current Im and the drive current Id or the average value of the sum of the motor current Im and the drive current Id. Thus, the instantaneous value of the sum of the motor current Im and the drive current Id and the average value of the sum of the motor current Im and the drive current Id can be detected by the instantaneous current detecting unit 95 and the average current detecting unit 96, which are physical means and which have simple configurations.

(E)

When the second fan motor 81 and the second motor driver 82 are built into the second fan motor device 8, it is difficult to separately dispose the wire on which the motor current Im that has been passed through the second fan motor 81 and the wire on which the drive current Id that has been passed through the second motor driver 82 flow. However, when the motor current detecting device 9 according to the present embodiment is applied in such a case, the motor current detecting device 9 can calculate the motor current Im with precision because the motor current Im is determined using the instantaneous value of the sum of the motor current Im and the drive current Id and the average value of the sum of the motor current Im and the drive current Id.

(F)

The motor current detecting device 9 according to the present embodiment further comprises the current leveling composed 92 for leveling the drive current Id before the drive current flows on the GND wire 93. Therefore, the motor current Im and an leveled drive current Id flow on the GND wire 93. The calculation unit 99 can thereby calculate an even more precise motor current Im because the instantaneous current detecting unit 95 and the average current detecting unit 96 respectively detect the instantaneous value and the average value of the sum of the motor current Im and the leveled drive current Id.

(G)

Particularly, the current leveling unit 92 in the motor current detecting device 9 can be configured from a so-called filter circuit composed of the resistor R1 and the capacitor C1. Thus, the motor current detecting device 9 is capable of leveling the drive current Id via the current leveling unit 92 having a simple configuration.

(H)

Furthermore, the motor current detecting device 9 can be used for detecting the current of the second fan motor 81 in an air conditioning apparatus 1. Thus, with the air conditioning apparatus 1 using the motor current detecting device 9, the control unit 11 can perform control such that the volume of air sent a room is constant, for example, on the basis of an accurate motor current Im calculated by the motor current detecting device 9.

Other Embodiments (a)

In the embodiment described above, an example was described of a case in which the air conditioning apparatus 1 was a desiccant-type outdoor air conditioner comprising heat exchangers in the interior. However, the air conditioning apparatus according to the present invention can also be applied to a desiccant air conditioner in which the heat exchangers are disposed separately from the air conditioning apparatus, or an air conditioner using a system other than a desiccant system.

(b)

In the embodiment described above, a case was described in which the instantaneous current detecting unit 95 and the average current detecting unit 96 were configured from hardware composed of resistors R2 to R5 and capacitors C2 to C4. However, the instantaneous current detecting unit 95 and the average current detecting unit 96 may also be configured from software as long as they can respectively detect the instantaneous value and the average value of the GND current Ig.

In the case that the instantaneous current detecting unit 95 and the average current detecting unit 96 are configured from hardware, the configuration of the instantaneous current detecting unit 95 and the average current detecting unit 96 is not limited to that shown in FIG. 4 and may be any manner of configuration. For example, in FIG. 4, the average current detecting unit 96 is configured from two resistors R4, R5 and two capacitors C3, C4, but may also be configured from one resistor and one capacitor as long as it is capable of detecting the average value of the GND current Ig.

(c)

In the embodiment described above, a case was described in which the motor current detecting device 9 included the current leveling unit 92 for leveling the drive current Id on the drive-use power supply wire 91. However, the motor current detecting device according to the present invention need not include the current leveling unit as long as it can detect the instantaneous value and the average value of the GND current Ig without leveling the drive current Id and can calculate the accurate motor current Im.

In the embodiment described above, a case was described in which the current leveling unit 92 was configured from filter composed of the resistor R1 and the capacitor C1. However, the current leveling unit may have any manner of configuration as long as it can level the drive current Id before the drive current Id flows on the GND wire 93.

(d)

In the embodiment described above, an example of a case was described in which the calculation unit 99 and the control unit 11 were configured from separate microcomputers. However, the calculation unit 99 and the control unit 11 may be configured from a single microcomputer. In this case, the single microcomputer can function as the calculation unit 99 or the control unit 11 by reading and executing a motor current calculation program or various device control programs stored in ROM, an HDD, or another type of memory.

(e)

In the embodiment described above, a case was described in which the motor current detecting device 9 detected the motor current Im of the second fan motor 81 in the second fan motor device 8, but the application of the motor current detecting device according to the present invention is not limited to this example. The motor current detecting device according to the present invention can also be applied to a case in which the motor and the driver are provided separately, but instead of separately providing a motor current GND wire on which the motor current Im flows and a drive current GND wire on which the drive current Id flows, the motor current Im and the drive current Id flow on a single GND wire, for example.

(f)

In the embodiment described above, a case was described in which the motor current detecting device 9 detected a GND current Ig including the motor current Im passed through the second fan motor 81 and calculated the motor current Im from this GND current Ig in order to control the volume of supplying air SA supplied into the room. However, the objective of the current detection performed by the motor current detecting device according to the present invention need not be the second fan motor 81. The motor current detecting device may also be used to detect currents for the first fan motor 7 or the compressor-use motor 5, for example.

The first fan motor 7 may be included with the first motor driver 71 in a fan motor device, similar to the second fan motor 81.

(g)

Figure 9:
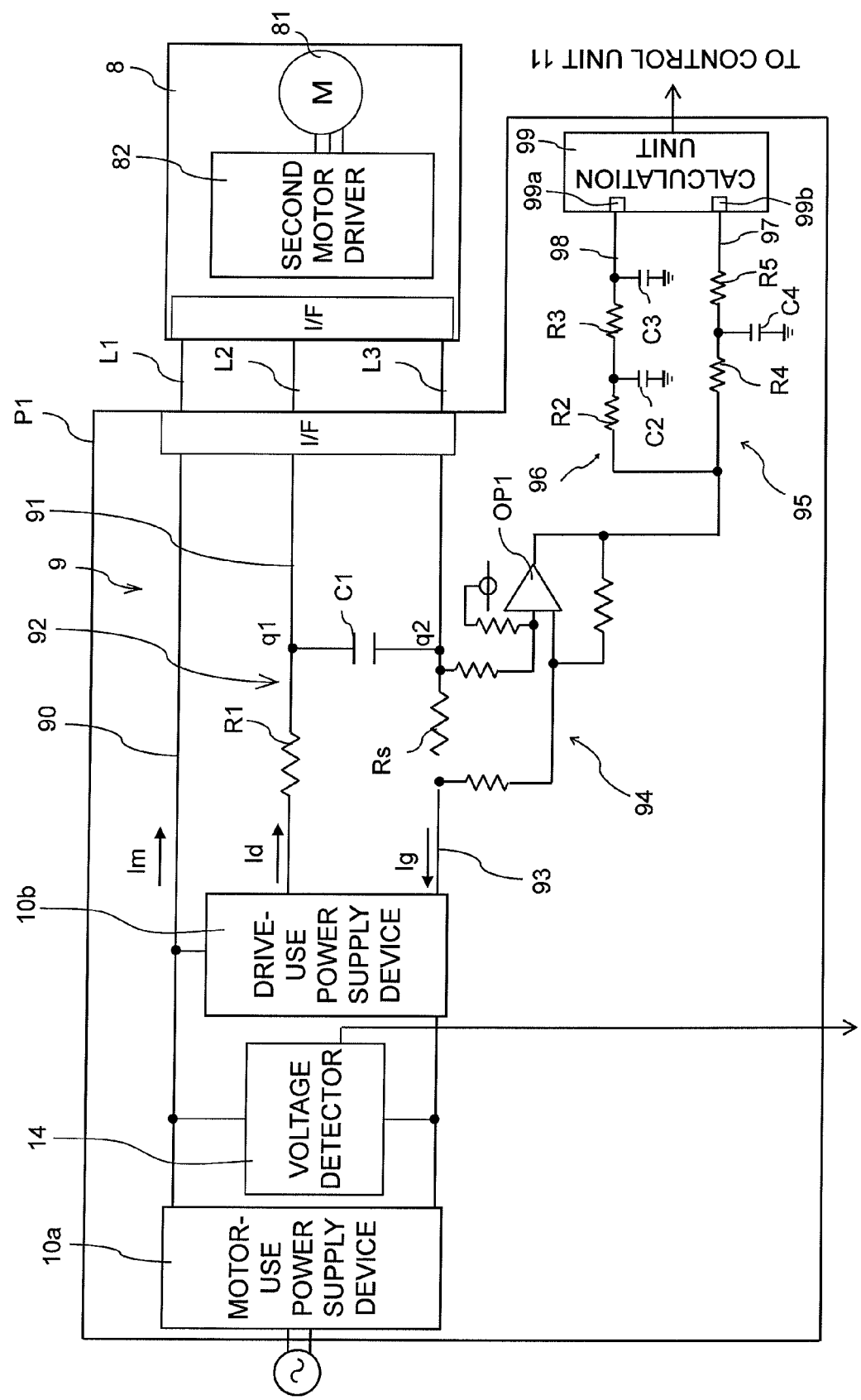
FIG. 9 is a diagram showing the internal circuit configuration of a printed board equipped with the motor current detecting device according to another embodiment (g), and the schematic configuration of the second fan motor device connected to this printed board.

In the embodiment described above, a voltage detector 14 may be connected between the output of the motor-use power supply device 10a and GND as shown in FIG. 9. The voltage detector 14 detects the voltage value of the power supply outputted from the motor-use power supply device 10a. The voltage value detected by the voltage detector 14 is sent to the control unit 11. The control unit 11 can thereby use the detected voltage value and the calculated motor current Im to calculate the motor power of the second fan motor 81. Consequently, the control unit 11 can use this motor power to perform various controls and the like on the second fan motor 81 and the other devices included in the air conditioning apparatus 1.

(h)

Figure 10:
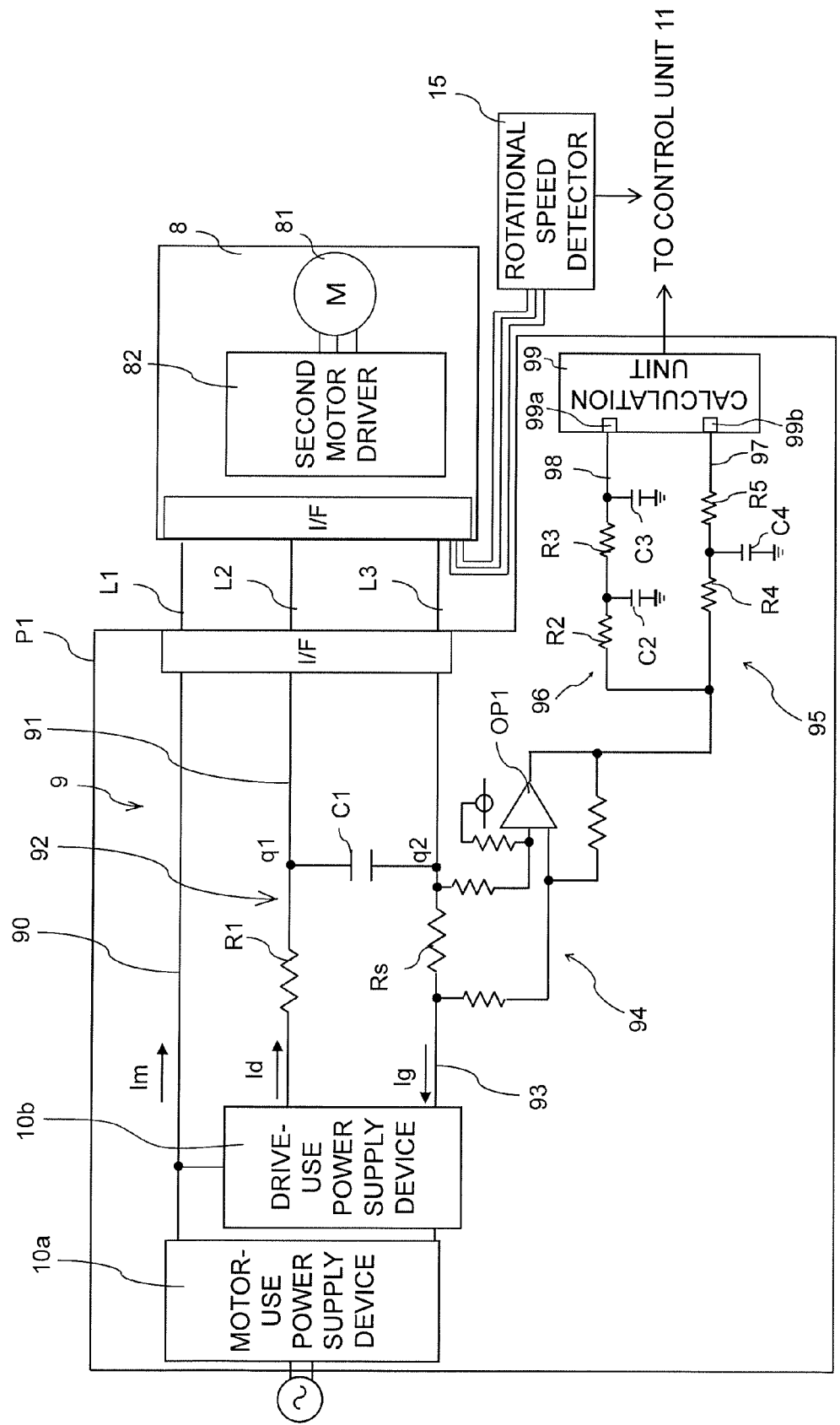
FIG. 10 is a diagram showing the internal circuit configuration of a printed board equipped with the motor current detecting device according to another embodiment (h), and the schematic configuration of the second fan motor device connected to this printed board.

In the embodiment described above, a rotational speed detector 15 for detecting the rotational speed of the second fan motor 81 may also be provided as shown in FIG. 10. This rotational speed detector 15 may be any type of detector, such as a type which is attached directly to the second fan motor device 8 and detects the rotational speed of the second fan motor 81, a type which detects the rotational speed by using an output signal from a Hall element for detecting the position of the rotor relative to the stator in the second fan motor 81, or a type which estimates the position of the rotor on the basis of the drive voltage outputted to the second fan motor 81 by the second motor driver 82 and uses the estimated rotor position to detect the rotational speed. Of the types described above, when the rotational speed detector 15 is not the type which is attached directly to the second fan motor device 8, the rotational speed detector 15 may be mounted either on the printed board P1 or on another printed board different from the printed board P1. FIG. 10 shows a case in which the rotational speed detector 15 is mounted on another printed board separate from the printed board P1. The rotational speed of the second fan motor 81 as detected by the rotational speed detector 15 is also sent to the control unit 11.

The control unit 11 can thereby use the detected rotational speed of the second fan motor 81 and the calculated motor current Im to calculate the motor torque of the second fan motor 81. Consequently, the control unit 11 can use this motor torque to perform various controls and the like on the second fan motor 81 and other devices included in the air conditioning apparatus 1.

INDUSTRIAL APPLICABILITY

The motor current detecting device according to the present invention has the effect of making it possible to precisely determine the motor current, and the motor current detecting device can be applied to an air conditioning apparatus.

What is claimed is:

1. A motor current detecting device comprising:
   a first wire configured and arranged to carry flow of
      a motor current that has been supplied from a motor-use power supply device, and has flowed to a motor by way of a motor current path, and has been passed through the motor and
      a drive current that is different from the motor current, has been supplied from a drive-use power supply device that is different from the motor-use power supply device, has flowed to a motor drive unit to drive the motor by way of a drive current path that is different from the motor current path, and has been passed through the motor drive unit;

an instantaneous current detecting unit configured and arranged to detect an instantaneous value for a sum of the motor current and the drive current flowing on the first wire;

an average electric current detecting unit configured and arranged to detect an average value of the sum of the motor current and the drive current flowing on the first wire; and a calculation unit configured to calculate the motor current by using simultaneously both of the instantaneous value detected by the instantaneous current detecting unit and the average value detected by the average current detecting unit, to determine an offset value in the instantaneous value as the drive current, and to calculate the motor current by subtracting the offset value from the average value.

2. The motor current detecting device according to claim 1, further comprising:

a second wire configured and arranged to transfer the instantaneous value detected by the instantaneous current detecting unit to the calculation unit; and a third wire configured and arranged to transfer the average value detected by the average current detecting unit to the calculation unit, the calculation unit having
   a first input unit connected to the second wire to receive input of the instantaneous value, and
   a second input unit connected to the third wire to receive input of the average value.

3. The motor current detecting device according to claim 2, further comprising:

a current detecting unit configured and arranged to detect the sum of the motor current and the drive current flowing on the first wire, the instantaneous current detecting unit having
   first resistors connected in series between the current detecting unit and the second wire, and
   a first capacitor connected in parallel relative to the first resistors, and the average current detecting unit having
   second resistors connected in series between the current detecting unit and the third wire, and
   second capacitors connected in parallel relative to the second resistors,
   with a first time constant of the first resistors and the first capacitor being less than a second time constant of the second resistors and the second capacitors.

4. An air conditioning apparatus including the motor current detecting device according to claim 3, the air conditioning apparatus further comprising:

a fan motor included in the motor device together with the motor drive unit, the fan motor being configured and arranged to pass the motor current therethrough;

a fan configured and arranged to be rotated by the fan motor; and a control unit configured to control a volume of air sent into a room from the fan on basis of the motor current that has been calculated by the calculation unit of the motor current detecting device.

5. The motor current detecting device according to claim 3, wherein
   the motor and the motor drive unit are included in a motor device.

6. The motor current detecting device according to claim 3, further comprising:
   a current leveling unit configured and arranged to level the drive current before the drive current flows on the first wire.

7. The motor current detecting device according to claim 2, wherein
   the motor and the motor drive unit are included in a motor device.

8. The motor current detecting device according to claim 2, further comprising:
   a current leveling unit configured and arranged to level the drive current before the drive current flows on the first wire.

9. The motor current detecting device according to claim 1, wherein
   the motor and the motor drive unit are included in a motor device.

10. The motor current detecting device according to claim 9, further comprising:
   a current leveling unit configured and arranged to level the drive current before the drive current flows on the first wire.

11. The motor current detecting device according to claim 1, further comprising:
   a current leveling unit configured and arranged to level the drive current before the drive current flows on the first wire.

12. The motor current detecting device according to claim 11, further comprising:
   a fourth wire configured and arranged to carry flow of the drive current, the current leveling unit having
      a third resistor connected in series to the fourth wire and
      a third capacitor connected to the fourth wire in parallel relative to the third resistor.

13. An air conditioning apparatus including the motor current detecting device according to claim 1, the air conditioning apparatus further comprising:

a fan motor included in the motor device together with the motor drive unit, the fan motor being configured and arranged to pass the motor current therethrough;

a fan configured and arranged to be rotated by the fan motor; and a control unit configured to control a volume of air sent into a room from the fan on basis of the motor current that has been calculated by the calculation unit of the motor current detecting device.

* * * * *